(12) United States Patent
Matsuo et al.

(10) Patent No.: US 10,260,575 B2
(45) Date of Patent: Apr. 16, 2019

(54) CONTROL APPARATUS FOR POWER TRANSMISSION SYSTEM

(71) Applicant: TOYOTA JIDOSHA KABUSHIKI KAISHA, Toyota-shi, Aichi-ken (JP)

(72) Inventors: Kenji Matsuo, Toyota (JP); Akira Hino, Toyota (JP); Hiroki Kondo, Miyoshi (JP); Mitsuhiro Fukao, Toyota (JP); Daisuke Inoue, Toyota (JP); Akihide Ito, Nagoya (JP); Motonori Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/519,292

(22) PCT Filed: Oct. 9, 2015

(86) PCT No.: PCT/IB2015/001836
§ 371 (c)(1),
(2) Date: Apr. 14, 2017

(87) PCT Pub. No.: WO2016/059457
PCT Pub. Date: Apr. 21, 2016

(65) Prior Publication Data
US 2017/0241492 A1     Aug. 24, 2017

(30) Foreign Application Priority Data
Oct. 17, 2014   (JP) ................. 2014-213232

(51) Int. Cl.
*F16D 11/14*     (2006.01)
*F16D 48/06*     (2006.01)
(Continued)

(52) U.S. Cl.
CPC ............ *F16D 48/066* (2013.01); *F16D 11/14* (2013.01); *F16D 25/082* (2013.01); *F16H 61/04* (2013.01);
(Continued)

(58) Field of Classification Search
CPC ...... F16D 48/066; F16D 11/14; F16D 25/082; F16D 2500/1026; F16D 2500/10462; F16D 2500/3024
See application file for complete search history.

(56) References Cited

U.S. PATENT DOCUMENTS 4,616,526 A * 10/1986 Morisawa ............ B60K 17/344
                                                        74/606 R
9,849,885 B2 * 12/2017 Sakamoto ............. B60W 30/19
(Continued)

FOREIGN PATENT DOCUMENTS

CN         102388240 A      3/2012
DE    10 2009 002205 A1    10/2010
(Continued)

*Primary Examiner* — Stacey A Fluhart
(74) *Attorney, Agent, or Firm* — Oliff PLC

(57) ABSTRACT

At the time when a hydraulic actuator is operated to engage a dog clutch, after it is detected that a hydraulic pressure for operating the hydraulic actuator is higher than or equal to a predetermined hydraulic pressure, it is determined whether the dog clutch is not engaged. Therefore, non-engagement determination due to insufficient hydraulic pressure for operating the hydraulic actuator is prevented. Thus, at the time when the hydraulic actuator is operated to engage the dog clutch, it is possible to prevent consumption of time to engage the dog clutch due to unnecessary re-engagement operation.

4 Claims, 5 Drawing Sheets

(51) Int. Cl.
  *F16H 61/04* (2006.01)
  *F16D 25/08* (2006.01)
  *F16H 61/30* (2006.01)
  *F16H 61/662* (2006.01)
  *F16H 37/08* (2006.01)
  *F16H 59/74* (2006.01)

(52) U.S. Cl.
  CPC ..... *F16H 61/30* (2013.01); *F16D 2500/1026* (2013.01); *F16D 2500/1088* (2013.01); *F16D 2500/10462* (2013.01); *F16D 2500/3024* (2013.01); *F16D 2500/3026* (2013.01); *F16D 2500/3069* (2013.01); *F16D 2500/30401* (2013.01); *F16D 2500/30415* (2013.01); *F16D 2500/30426* (2013.01); *F16D 2500/50607* (2013.01); *F16D 2500/50615* (2013.01); *F16D 2500/525* (2013.01); *F16D 2500/70406* (2013.01); *F16H 37/0846* (2013.01); *F16H 59/74* (2013.01); *F16H 61/662* (2013.01); *F16H 2059/746* (2013.01); *F16H 2061/0474* (2013.01)

(56) References Cited

U.S. PATENT DOCUMENTS

| | | |
|---|---|---|
| 2011/0301819 A1 | 12/2011 | Arnold et al. |
| 2013/0253788 A1 | 9/2013 | Arnold et al. |
| 2016/0025161 A1* | 1/2016 | Matsuo ................ F16H 37/022 |
| | | 477/180 |
| 2016/0052522 A1 | 2/2016 | Matsuo et al. |
| 2016/0305522 A1* | 10/2016 | Fukao .................... B60K 17/00 |

FOREIGN PATENT DOCUMENTS

| | | |
|---|---|---|
| EP | 1288534 A2 | 3/2003 |
| JP | 2003-074684 A | 3/2003 |
| JP | 2004-196055 A | 7/2004 |
| JP | 2006-070921 A | 3/2006 |
| JP | 2012-159037 A | 8/2012 |
| WO | 2014/162563 A1 | 10/2014 |

* cited by examiner

CONTROL APPARATUS FOR POWER TRANSMISSION SYSTEM

BACKGROUND OF THE INVENTION

1. Field of the Invention

The invention relates to a control apparatus for a power transmission system including a dog clutch that connects or interrupts a power transmission path and that is actuated by a hydraulic actuator.

2. Description of Related Art

There is well known a power transmission system including a dog clutch that connects or interrupts a power transmission path and a hydraulic actuator that engages or releases the dog clutch. This is, for example, an automatic transmission described in Japanese Patent Application Publication No. 2003-74684 (JP 2003-74684 A). In the dog clutch, for example, after a synchronizer ring is synchronized with a synchronized gear, spline teeth provided on the inner periphery of a sleeve are meshed with spline teeth provided on the synchronizer ring and further meshed with spline teeth provided on the synchronized gear as a result of movement of the sleeve. Thus, the dog clutch is engaged. At the time of engaging such a dog clutch, there is a possibility that an uplock occurs because of the structure of a synchromesh mechanism. The uplock is such an engagement fault of the dog clutch (synchromesh mechanism) that the spline teeth cannot be meshed with each other because the tooth tips of the spline teeth contact each other and, as a result, the dog clutch is not engaged. In contrast, JP 2003-74684 A describes that, when an uplock of the dog clutch is detected in shifting into a speed position required through shift lever operation during engine stop, a shift is once carried out into a predetermined speed position different from the required speed position and then a shift into the required speed position is retried.

Incidentally, when hydraulic pressure for operating the hydraulic actuator is insufficient, there is a possibility that the sleeve cannot be moved to a completely engaged position of the dog clutch and, as a result, a shift into the required speed position cannot be carried out. Such a state where the sleeve cannot be moved is apparently the same as a state where there is an uplock. When an uplock is detected on the basis of the position of the sleeve and a synchronization state resulting from engagement, it is not possible to distinguish whether it is due to insufficient hydraulic pressure or it is due to occurrence of an actual uplock. Therefore, if it is uniformly determined that there is an uplock, and a retry operation (re-engagement operation of the hydraulic actuator) is carried out, it takes time to engage the dog clutch more than necessary, so there is a concern that drivability (for example, acceleration response) deteriorates. The above-described inconvenience is not publicly known.

SUMMARY OF THE INVENTION

The invention is contemplated in the context of the above situation, and provides a control apparatus for a power transmission system, which is able to prevent delay to engage a dog clutch due to unnecessary re-engagement operation at the time when a hydraulic actuator is operated to engage the dog clutch.

An aspect of the invention provides a control apparatus for a power transmission system. The power transmission system includes a dog clutch and a hydraulic actuator. The dog clutch is configured to connect or interrupt a power transmission path that transmits power of a driving force source to a drive wheel side. The hydraulic actuator is configured to operate to engage or release the dog clutch. The control apparatus includes an electronic control unit. The electronic control unit is configured to, when the electronic control unit operates the hydraulic actuator to engage the dog clutch, (i) when the electronic control unit detects a hydraulic pressure for operating the hydraulic actuator is higher than or equal to a predetermined hydraulic pressure, determine whether the dog clutch is not engaged; and (ii) when the electronic control unit determines that the dog clutch is not engaged at the time, operate the hydraulic actuator to engage the dog clutch again.

The electronic control unit may be configured to determine whether the dog clutch is not engaged based on a moving distance of a movable member that engages the dog clutch. Alternatively, the electronic control unit may be configured to determine whether the dog clutch is not engaged based on rotational speeds of two rotating members, the rotational speeds changing as the dog clutch is engaged.

With the above-described control apparatus for a power transmission system, at the time when the hydraulic actuator is operated to engage the dog clutch, after it is detected that the hydraulic pressure for operating the hydraulic actuator is higher than or equal to the predetermined hydraulic pressure, it is determined whether the dog clutch is not engaged. Therefore, non-engagement determination due to insufficient hydraulic pressure for operating the hydraulic actuator is prevented. Thus, at the time when the hydraulic actuator is operated to engage the dog clutch, it is possible to prevent consumption of time to engage the dog clutch due to an unnecessary re-engagement operation.

In the control apparatus according to the invention, the power transmission system may further include a mechanical oil pump. The mechanical oil pump is configured to generate a source pressure for a predetermined hydraulic pressure that operates the hydraulic actuator by being rotationally driven by the driving force source. The electronic control unit may be configured to, at the time when the driving force source starts operating a state where the driving force source is stopped, determine whether the hydraulic pressure for operating the hydraulic actuator is higher than or equal to the predetermined hydraulic pressure. With this configuration, at the time when the driving force source starts operating from a state where the driving force source is stopped, for the possibility that it is not possible to quickly complete engagement because of insufficient hydraulic pressure even when the hydraulic actuator starts operating to engage the dog clutch, non-engagement due determination due to insufficient hydraulic pressure for operating the hydraulic actuator is prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
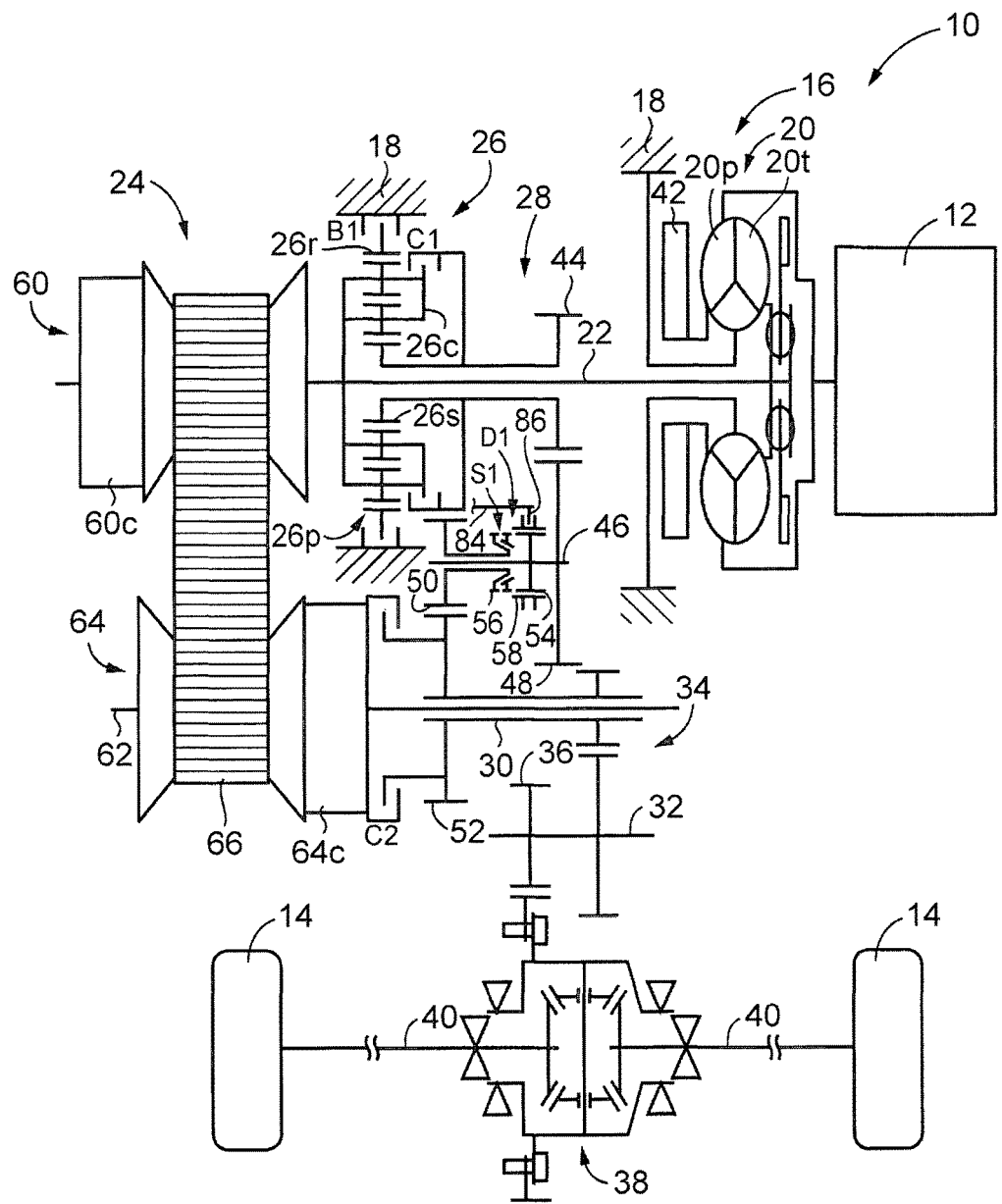
FIG. 1 is a view that illustrates the schematic configuration of a vehicle to which an embodiment of the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The engine 12 is, for example, a gasoline engine or a diesel engine. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission mechanism. The forward/reverse switching device 26 is also coupled to the input shaft 22. The gear mechanism 28 is coupled to the input shaft 22 via the forward/reverse switching device 26. The gear mechanism 28 is provided in parallel with the continuously variable transmission 24. The output shaft 30 is an output rotating member common to the continuously variable transmission 24 and the gear mechanism 28. The reduction gear unit 34 is formed of a pair of gears. The pair of gears are respectively provided on the output shaft 30 and the counter shaft 32 so as to be relatively non-rotatable, and are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 sequentially via the torque converter 20, the continuously variable transmission 24 (or the forward/reverse switching device 26 and the gear mechanism 28), the reduction gear unit 34, the differential gear 38, the axles 40, and the like.

In this way, the power transmission system 16 includes the continuously variable transmission 24 and the gear mechanism 28 provided in parallel with each other between the engine 12 (which is synonymous with the input shaft 22 that is an input rotating member to which the power of the engine 12 is transmitted) and the drive wheels 14 (which are synonymous with the output shaft 30 that is an output rotating member that outputs the power of the engine 12 to the drive wheels 14). Thus, the power transmission system 16 includes a first power transmission path and a second power transmission path. The first power transmission path transmits the power of the engine 12 from the input shaft 22 to the drive wheels 14 side (that is, the output shaft 30) via the gear mechanism 28. The second power transmission path transmits the power of the engine 12 from the input shaft 22 to the drive wheels 14 side (that is, the output shaft 30) via the continuously variable transmission 24. The power transmission system 16 is configured to change the power transmission path between the first power transmission path and the second power transmission path on the basis of a traveling state of the vehicle 10. Therefore, the power transmission system 16 includes clutch mechanisms that selectively change the power transmission path, which transmits the power of the engine 12 to the drive wheels 14 side, between the first power transmission path and the second power transmission path. The clutch mechanisms include a forward clutch C1, a reverse brake B1 and a CVT drive (continuously variable shift drive) clutch C2. The forward clutch C1 and the reverse brake B1 serve as a first clutch that connects or interrupts the first power transmission path (in other words, a first clutch that establishes the first power transmission path when the first clutch is engaged). The CVT drive clutch C2 serves as a second clutch that connects or interrupts the second power transmission path (in other words, a second clutch that establishes the second power transmission path when the second clutch is engaged). The forward clutch C1, the reverse brake B1 and the CVT drive clutch C2 correspond to a separating device. Each of the CVT drive clutch C2, the forward clutch C1 and the reverse brake B1 is a known hydraulic friction engagement device (friction clutch) that is frictionally engaged by a hydraulic actuator. Each of the forward clutch C1 and the reverse brake B1 is one of elements that constitute the forward/reverse switching device 26, as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 42 is coupled to the pump impeller 20p. The oil pump 42 generates hydraulic pressure as the oil pump 42 is rotationally driven by the engine 12. The hydraulic pressure is used to control a shift of the continuously variable transmission 24, generate a belt clamping force in the continuously variable transmission 24, change the operation of each of the clutch mechanisms, or supply lubricating oil to portions of the power transmission path of the power transmission system 16.

The forward/reverse switching device 26 is provided around the input shaft 22 coaxially with the input shaft 22 in the first power transmission path. The forward/reverse switching device 26 includes a double-pinion-type planetary gear train 26p, the forward clutch C1 and the reverse brake B1. The planetary gear train 26p is a differential mechanism including three rotating elements, that is, a carrier 26c, a sun gear 26s and a ring gear 26r. The carrier 26c serves as an input element. The sun gear 26s serves as an output element. The ring gear 26r serves as a reaction element. The carrier 26c is integrally coupled to the input shaft 22. The ring gear 26r is selectively coupled to the housing 18 via the reverse brake B1. The sun gear 26s is coupled to a small-diameter gear 44. The small-diameter gear 44 is provided around the input shaft 22 coaxially with the input shaft 22 so as to be relatively rotatable. The carrier 26c and the sun gear 26s are selectively coupled to each other via the forward clutch C1. Thus, the forward clutch C1 is the clutch mechanism that selectively couples two of the three rotating elements to each other. The reverse brake B1 is the clutch mechanism that selectively couples the reaction element to the housing 18.

The gear mechanism 28 includes the small-diameter gear 44 and a large-diameter gear 48. The large-diameter gear 48 is provided around a gear mechanism counter shaft 46 coaxially with the gear mechanism counter shaft 46 so as to be relatively non-rotatable. The large-diameter gear 48 is in mesh with the small-diameter gear 44. The gear mechanism 28 includes an idler gear 50 and an output gear 52. The idler gear 50 is provided around the gear mechanism counter shaft 46 coaxially with the gear mechanism counter shaft 46 so as to be relatively rotatable. The output gear 52 is provided around the output shaft 30 coaxially with the output shaft 30 so as to be relatively non-rotatable. The output gear 52 is in mesh with the idler gear 50. The output gear 52 has a larger diameter than the idler gear 50. Therefore, the gear mechanism 28 is the gear mechanism having a gear ratio (gear stage) as a predetermined gear ratio (gear stage) in the power transmission path between the input shaft 22 and the output shaft 30. A dog clutch D1 is further provided around the gear mechanism counter shaft 46 between the large-diameter gear 48 and the idler gear 50. The dog clutch D1 selectively connects the large-diameter gear 48 to the idler gear 50 or disconnects the large-diameter gear 48 from the idler gear 50. The dog clutch D1 functions as a third clutch (in other words, the third clutch that establishes the first power transmission path when engaged together with the first clutch). The dog clutch D1 is provided in the power transmission system 16, and is arranged in the power transmission path between the forward/reverse switching device 26 (which is synonymous with the first clutch) and the output shaft 30. The dog clutch D1 connects or interrupts the first power transmission path. The dog clutch D1 is included in the clutch mechanisms.

Specifically, the dog clutch D1 includes a clutch hub 54, a clutch gear 56 and a cylindrical sleeve 58. The clutch hub 54 is provided around the gear mechanism counter shaft 46 coaxially with the gear mechanism counter shaft 46 so as to be relatively non-rotatable. The clutch gear 56 is arranged between the idler gear 50 and the clutch hub 54, and is fixed to the idler gear 50. The sleeve 58 is spline-fitted to the clutch hub 54. Thus, the sleeve 58 is provided so as to be relatively non-rotatable around the axis of the gear mechanism counter shaft 46 and relatively movable in a direction parallel to the axis. When the sleeve 58 that is constantly rotated integrally with the clutch hub 54 is moved toward the clutch gear 56 and is meshed with the clutch gear 56, the idler gear 50 and the gear mechanism counter shaft 46 are connected to each other. The dog clutch D1 includes a known synchromesh mechanism S1 that serves as a synchronization mechanism. The synchromesh mechanism S1 synchronizes rotations at the time of fitting the sleeve 58 to the clutch gear 56. In the thus configured dog clutch D1, the sleeve 58 is slidably moved in a direction parallel to the axis of the gear mechanism counter shaft 46. Thus, the dog clutch D1 is changed between an engaged state and a released state.

In the power transmission system 16, when the forward clutch C1 (or the reverse brake B1) and the dog clutch D1 both are engaged in the first power transmission path, a forward power transmission path (or a reverse power transmission path) is established. Thus, the power of the engine 12 is transmitted from the input shaft 22 to the output shaft 30 via the gear mechanism 28. In the power transmission system 16, when at least both the forward clutch C1 and the reverse brake B1 are released or at least the dog clutch D1 is released, the first power transmission path is set to a neutral state (power transmission interrupted state) where transmission of power is interrupted.

The continuously variable transmission 24 is provided in a power transmission path between the input shaft 22 and the output shaft 30. The continuously variable transmission 24 includes a primary pulley 60, a secondary pulley 64 and a transmission belt 66. The primary pulley 60 is provided on the input shaft 22, and has a variable effective diameter. The secondary pulley 64 is provided on a rotary shaft 62 coaxial with the output shaft 30, and has a variable effective diameter. The transmission belt 66 is wound around those variable pulleys 60, 64 so as to span between the variable pulleys 60, 64. Power is transmitted via a friction force between each of the variable pulleys 60, 64 and the transmission belt 66. In the continuously variable transmission 24, when the winding diameter (effective diameter) of the transmission belt 66 is changed as a result of a change in the V-groove width of each of the pair of pulleys 60, 64, a speed ratio (gear ratio) γ (=Primary pulley rotational speed Npri/ Secondary pulley rotational speed Nsec) is continuously changed. The output shaft 30 is arranged around the rotary shaft 62 so as to be relatively rotatable coaxially with the rotary shaft 62. The CVT drive clutch C2 is provided on the drive wheels 14 side with respect to the continuously variable transmission 24 (that is, the CVT drive clutch C2 is provided between the secondary pulley 64 and the output shaft 30). The CVT drive clutch C2 selectively connects the secondary pulley 64 (rotary shaft 62) to the output shaft 30 or disconnects the secondary pulley 64 (rotary shaft 62) from the output shaft 30. In the power transmission system 16, when the CVT drive clutch C2 is engaged in the second power transmission path, the power transmission path is established. Thus, the power of the engine 12 is transmitted from the input shaft 22 to the output shaft 30 via the continuously variable transmission 24. In the power transmission system 16, when the CVT drive clutch C2 is released, the second power transmission path is set to a neutral state.

Figure 2:
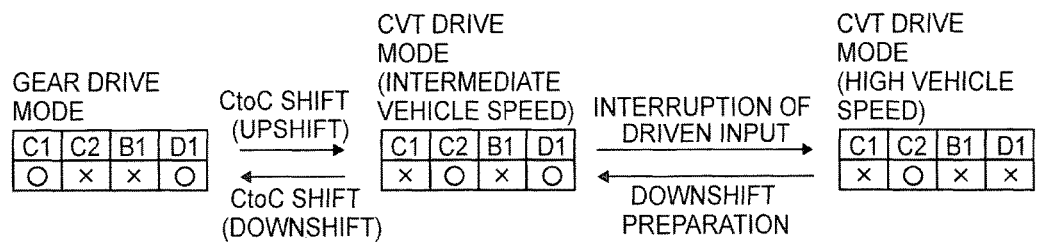
FIG. 2 is a view for illustrating changes in driving pattern of a power transmission system according to the embodiment.

The operation of the power transmission system 16 will be described below. FIG. 2 is a view for illustrating changes in driving pattern (drive mode) of the power transmission system 16 by using an engagement chart of engagement elements for each driving pattern. In FIG. 2, C1 corresponds to the operation state of the forward clutch C1, C2 corresponds to the operation state of the CVT drive clutch C2, B1 corresponds to the operation state of the reverse brake B1, D1 corresponds to the operation state of the dog clutch D1, "O" indicates an engaged (connected) state, and "x" indicates a released (disconnected) state.

In FIG. 2, for example, in the driving pattern of the gear drive mode in which the forward clutch C1 and the dog clutch D1 are engaged and the CVT drive clutch C2 and the reverse brake B1 are released, the power of the engine 12 is transmitted to the output shaft 30 sequentially via the torque converter 20, the forward/reverse switching device 26, the gear mechanism 28, and the like. In the driving pattern of the gear drive mode in which, for example, the reverse brake B1 and the dog clutch D1 are engaged and the CVT drive clutch C2 and the forward clutch C1 are released, reverse traveling is enabled.

For example, in the driving pattern of the CVT drive mode (high vehicle speed) in which, for example, the CVT drive clutch C2 is engaged and the forward clutch C1, the reverse brake B1 and the dog clutch D1 are released, the power of the engine 12 is transmitted to the output shaft 30 sequentially via the torque converter 20, the continuously variable transmission 24, and the like. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, the constituent members (for example, pinion gears) of the planetary gear train 26$p$, and the like, at a high vehicle speed. The dog clutch D1 functions as a driven input interrupting clutch that interrupts input from the drive wheels 14 side.

The gear drive mode is, for example, selected in a low vehicle speed region including a state during a stop of the vehicle. A gear ratio $\gamma 1$ that is established by the first power transmission path is set to a value larger than (a gear ratio at the lower side than) the lowest vehicle speed-side gear ratio (lowest gear ratio) $\gamma$ max that can be established by the second power transmission path. For example, the gear ratio $\gamma 1$ corresponds to a first-speed gear ratio in the power transmission system 16, and the lowest gear ratio $\gamma$ max corresponds to a second-speed gear ratio in the power transmission system 16. Therefore, the gear drive mode and the CVT drive mode are changed in accordance with, for example, a shift line for changing the gear stage between the first gear stage and the second gear stage in a shift map of a known stepped transmission. In the CVT drive mode, the continuously variable transmission 24 is shifted on the basis of a traveling state, such as an accelerator operation amount and a vehicle speed, by using, for example, a known technique.

In changing the driving pattern from the gear drive mode to the CVT drive mode (high vehicle speed) or changing the driving pattern from the CVT drive mode (high vehicle speed) to the gear drive mode, the change is carried out via the driving pattern of a CVT drive mode (intermediate vehicle speed) as shown in FIG. 2 transitionally. In the driving pattern of the CVT drive mode (intermediate vehicle speed), the dog clutch D1 is further engaged in the CVT drive mode (high vehicle speed). For example, when the driving pattern is changed from the gear drive mode to the CVT drive mode (high vehicle speed), the driving pattern is transitionally changed to the CVT drive mode (intermediate vehicle speed) by carrying out a clutch engagement changing shift (for example, clutch-to-clutch shift (hereinafter, referred to as CtoC shift)) so as to release the forward clutch C1 and engage the CVT drive clutch C2. After that, the dog clutch D1 is released. For example, when the driving pattern is changed from the CVT drive mode (high vehicle speed) to the gear drive mode, the driving pattern is transitionally changed to the CVT drive mode (intermediate vehicle speed) by engaging the dog clutch D1 in preparation for changing the driving pattern to the gear drive mode. After that, a clutch engagement changing shift (for example, CtoC shift) is carried out so as to release the CVT drive clutch C2 and engage the forward clutch C1.

Figure 3:
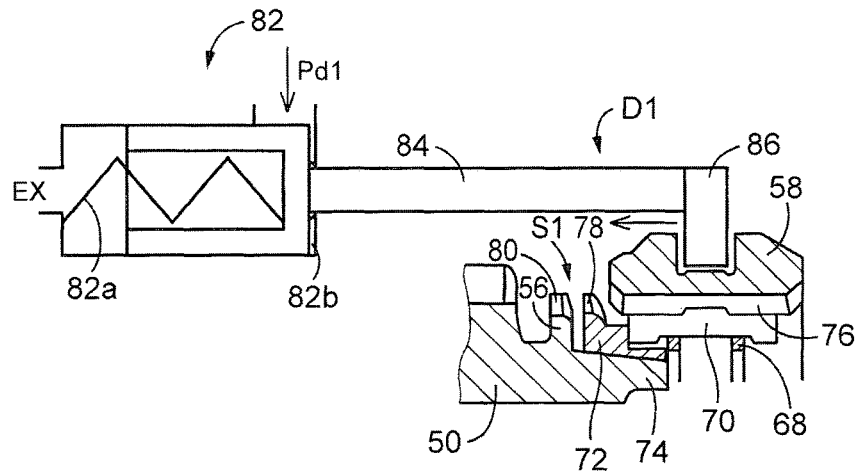
FIG. 3 is a view for illustrating how a dog clutch is changed between an engaged state and a released state in the power transmission system according to the embodiment, and shows a state where the dog clutch is released.
Figure 4:
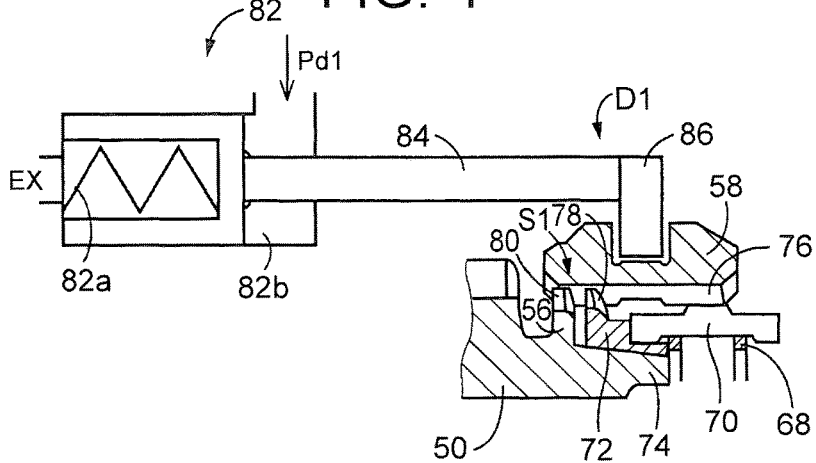
FIG. 4 is a view for illustrating how the dog clutch is changed between the engaged state and the released state, and shows a state where the dog clutch is engaged.

FIG. 3 and FIG. 4 both are views for illustrating how the dog clutch D1 is changed between an engaged state and a released state. FIG. 3 shows a state where the dog clutch D1 is released. FIG. 4 shows a state where the dog clutch D1 is engaged. As shown in FIG. 3 and FIG. 4, the synchromesh mechanism S1 includes a key spring 68, a shifting key 70, a synchronizer ring 72 and a cone portion 74. The shifting key 70 is engaged with the sleeve 58 by the key spring 68. The synchronizer ring 72 is rotated together with the shifting key 70 with a predetermined play. The cone portion 74 is provided on the clutch gear 56. Spline teeth 76 are provided on the inner periphery of the sleeve 58. The spline teeth 76 are spline-fitted to the clutch hub 54 (see FIG. 1). When the sleeve 58 is moved from the released position shown in FIG. 3 toward the clutch gear 56 (in the arrow direction in the drawing), the synchronizer ring 72 is pressed against the cone portion 74 via the shifting key 70, and power is transmitted to the clutch gear 56 by friction therebetween. When the sleeve 58 is further moved toward the clutch gear 56, the spline teeth 76 are meshed with the spline teeth 78 provided on the synchronizer ring 72 and the spline teeth 80 provided on the clutch gear 56, as shown in FIG. 4. Thus, the clutch hub 54 and the clutch gear 56 are integrally connected, and the power transmission path is established between the forward/reverse switching device 26 and the output shaft 30.

As shown in FIG. 3 and FIG. 4, the power transmission system 16 includes the hydraulic actuator 82 that is operated to engage or release the dog clutch D1. In the dog clutch D1, pressing force that presses the sleeve 58 toward the releasing side (see FIG. 3) constantly acts on the sleeve 58 via a fork shaft 84 and a shift fork 86 by the urging force of a return spring 82$a$ of the hydraulic actuator 82. A hydraulic pressure Pd1 for operating the hydraulic actuator 82 is regulated by a hydraulic control circuit 88 (see FIG. 5) by using a hydraulic pressure, which is generated by the oil pump 42 that is rotationally driven by the engine 12, as a source pressure. When the hydraulic pressure Pd1 is supplied to an oil chamber 82$b$ of the hydraulic actuator 82, a pressing force against the urging force of the return spring 82$a$ is generated, and engagement force for moving the sleeve 58 toward an engaging side (see FIG. 4) against the pressing force acts on the sleeve 58 via the fork shaft 84 and the shift fork 86. When the hydraulic pressure Pd1 higher than a predetermined hydraulic pressure A is supplied to the oil chamber 82$b$, the sleeve 58 is moved to a position at which the dog clutch D1 is placed in the engaged state. The predetermined hydraulic pressure A is, for example, a lower limit value of the hydraulic pressure Pd1 obtained experimentally or by design and stored in advance (that is, determined in advance) for moving the sleeve 58 to the position at which the dog clutch D1 is placed in the engaged state. The predetermined hydraulic pressure A may be, for example, a value that is changed on the basis of an oil temperature, or the like. In this way, in the dog clutch D1, when the fork shaft 84 is actuated by the hydraulic actuator 82, the sleeve 58 is caused to slide in the direction parallel to the axis of the gear mechanism counter shaft 46 via the shift fork 86 fixed to the fork shaft 84, and the engaged state and the released state are changed.

Figure 5:
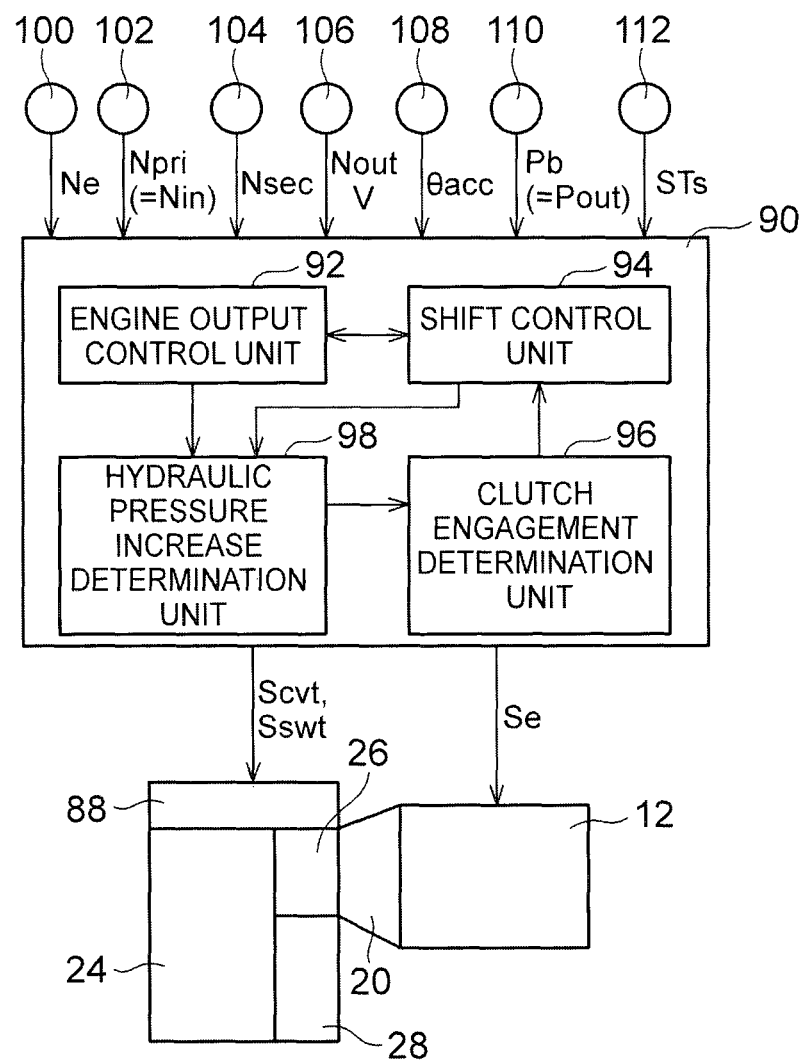
FIG. 5 is a view that illustrates a relevant portion of control functions and control system for various controls in the vehicle.

FIG. 5 is a view that illustrates a relevant portion of control functions and control system for various controls in the vehicle 10. As shown in FIG. 5, the vehicle 10 includes, for example, an electronic control unit 90 including, for example, a control unit for the power transmission system 16. The control unit changes the driving pattern of the power transmission system 16. Thus, FIG. 5 is a view that shows input/output lines of the electronic control unit 90, and is a functional block diagram that illustrates a relevant portion of control functions implemented by the electronic control unit 90. The electronic control unit 90 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 90 is configured to execute output control over the engine 12, shift control and belt clamping force control over the continuously variable transmission 24, control for changing the driving pattern of the power transmission system 16, and the like. Where necessary, the electronic control unit 90 is split into an electronic control unit for controlling the engine, an electronic control unit for controlling hydraulic pressure, and the like.

Various actual values based on detection signals of various sensors of the vehicle 10 are supplied to the electronic control unit 90. The various sensors include, for example, various rotational speed sensors 100, 102, 104, 106, an accelerator operation amount sensor 108, a belt clamping pressure sensor 110, a stroke sensor 112, and the like. The actual values include, for example, an engine rotational speed Ne, a primary pulley rotational speed Npri, a secondary pulley rotational speed Nsec, an output shaft rotational speed Nout, an accelerator operation amount θacc, a belt clamping pressure Pb, a synchronization stroke STs, and the like. The primary pulley rotational speed Npri is equal to the input shaft rotational speed Nin. The secondary pulley rotational speed Nsec is equal to the rotational speed of the rotary shaft 62. The output shaft rotational speed Nout corresponds to a vehicle speed V. The belt clamping pressure Pb is a secondary pressure Pout that is supplied to a hydraulic cylinder 64c of the secondary pulley 64. The synchronization stroke STs is a moving position of the hydraulic actuator 82 that actuates the sleeve 58 (for example, a moving distance of a movable member, such as the shift fork 86, for engaging the dog clutch D1), which corresponds to information about the position of the sleeve 58 between the releasing-side position of the sleeve 58 and the engaging-side position of the sleeve 58. At the releasing-side position of the sleeve 58, the dog clutch D1 is placed in a completely released state. At the engaging-side position of the sleeve 58, the dog clutch D1 is placed in a completely engaged state. An engine output control command signal Se, a hydraulic control command signal Scvt, a hydraulic control command signal Sswt, and the like, are output from the electronic control unit 90. The engine output control command signal Se is used to control the output of the engine 12. The hydraulic control command signal Scvt is used to control hydraulic pressure associated with a shift of the continuously variable transmission 24. The hydraulic control command signal Sswt is used to control the forward/reverse switching device 26, the CVT drive clutch C2 and the dog clutch D1 associated with a change of the driving pattern of the power transmission system 16. For example, command signals (command pressures) for respectively driving solenoid valves that control hydraulic pressures that are supplied to hydraulic actuators of the forward clutch C1, the reverse brake B1, the CVT drive clutch C2 and the dog clutch D1 are output to a hydraulic control circuit 88 as the hydraulic control command signal Sswt.

The electronic control unit 90 includes an engine output control unit 92 and a shift control unit 94. The engine output control unit 92 controls engine output. The shift control unit 94 controls a shift.

The engine output control unit 92, for example, calculates a required driving force Fdem on the basis of the accelerator operation amount θacc and the vehicle speed V by using a correlation (for example, a driving force map) determined in advance, sets a target engine torque Tetgt by which the required driving force Fdem is obtained, and outputs, to a throttle actuator, a fuel injection device, an ignition device, and the like, the engine output control command signal Se for output control over the engine 12 such that the target engine torque Tetgt is obtained.

When the engine output control unit 92 begins to start up the engine 12 in P range or N range while the vehicle is stopped, the shift control unit 94 outputs, to the hydraulic control circuit 88, a command to operate the hydraulic actuator 82 to engage the dog clutch D1 in preparation for the gear drive mode. After that, at the time of a shift into D range (or R range), the shift control unit 94 outputs, to the hydraulic control circuit 88, a command to engage the forward clutch C1 (or the reverse brake B1).

In the CVT drive mode, for example, the shift control unit 94 determines a command hydraulic pressure (hydraulic control command signal Scvt) of each of hydraulic pressures respectively supplied to the hydraulic cylinders of the primary pulley 60 and secondary pulley 64 on the basis of the accelerator operation amount θacc, the vehicle speed V, and the like, from a predetermined correlation (for example, a CVT shift map, a belt clamping force map). The shift control unit 94 outputs those command hydraulic pressures to the hydraulic control circuit 88, and carries out a CVT shift. The determined command hydraulic pressures are respectively supplied to the hydraulic cylinders to achieve a target gear ratio γtgt of the continuously variable transmission 24 while a belt slip of the continuously variable transmission 24 does not occur. The target gear ratio γtgt is set such that the operating point of the engine 12 is on a predetermined optimal line (for example, an engine optimal fuel consumption line).

The shift control unit 94 controls a change of the driving pattern between the gear drive mode and the CVT drive mode. Specifically, for example, the shift control unit 94 determines whether to change the gear ratio on the basis of the vehicle speed V and the accelerator operation amount θacc by using an upshift line and a downshift line with a predetermined hysteresis for changing the gear ratio between the first-speed gear ratio and the second-speed gear ratio. The shift control unit 94 changes the driving pattern on the basis of the determined result. The first-speed gear ratio corresponds to the gear ratio γ1 in the gear drive mode. The second-speed gear ratio corresponds to the lowest gear ratio γ max in the CVT drive mode.

When the shift control unit 94 determines to upshift in the gear drive mode and changes the driving pattern from the gear drive mode to the CVT drive mode (high vehicle speed), the shift control unit 94 initially carries out a CtoC shift to transitionally change the driving pattern from the gear drive mode to the CVT drive mode (intermediate vehicle speed). Thus, the power transmission path in the power transmission system 16 is changed from the first power transmission path to the second power transmission path. Subsequently, the shift control unit 94 changes the driving pattern from the CVT drive mode (intermediate vehicle speed) to the CVT drive mode (high vehicle speed) by outputting, to the hydraulic control circuit 88, a command to operate the hydraulic actuator 82 to release the dog clutch D1. When the shift control unit 94 determines to downshift in the CVT drive mode (high vehicle speed) and changes the driving pattern from the CVT drive mode (high vehicle speed) to the gear drive mode, the shift control unit 94 initially transitionally changes the driving pattern from the CVT drive mode (high vehicle speed) to the CVT drive mode (intermediate vehicle speed) by outputting, to the hydraulic control circuit 88, a command to operate the hydraulic actuator 82 to engage the dog clutch D1. Subsequently, the shift control unit 94 carries out a CtoC shift to change the driving pattern from the CVT drive mode (intermediate vehicle speed) to the gear drive mode. Thus, the power transmission path in the power transmission system 16 is changed from the second power transmission path to the first power transmission path. In change control for changing the driving pattern between the gear drive mode and the CVT drive mode, the change is carried out via the CVT drive mode (intermediate vehicle speed) transitionally, so the first power transmission path and the second power transmission path are changed only by exchanging torque through a CtoC shift. Therefore, a change shock is suppressed.

At the time when the hydraulic actuator 82 is operated to engage the dog clutch D1, there may occur an uplock. In the uplock, the tooth tips of the spline teeth 76 of the sleeve 58 and the tooth tips of the spline teeth 78 of the synchronizer ring 72 or the tooth tips of the spline teeth 80 of the clutch gear 56 contact (collide) with each other, with the result that the dog clutch D1 is not engaged. In contrast, when it is determined that the dog clutch D1 is not engaged at the time when the hydraulic actuator 82 is operated to engage the dog clutch D1, the shift control unit 94 once operates the hydraulic actuator 82 to release the dog clutch D1, and then operates the hydraulic actuator 82 to engage the dog clutch D1 again.

Therefore, the electronic control unit 90 further includes a clutch engagement determination unit 96 that determines whether the clutch is engaged. For example, when the shift control unit 94 starts engagement of the dog clutch D1 by outputting a command to operate the hydraulic actuator 82 to engage the dog clutch D1 (that is, at the time when the dog clutch D1 is engaged), the clutch engagement determination unit 96 determines on the basis of the synchronization stroke STs whether engagement of the dog clutch D1 (synchromesh mechanism S1) has completed (in other words, whether the dog clutch D1 is not engaged). For example, when the synchronization stroke STs is larger than or equal to a predetermined stroke, the clutch engagement determination unit 96 determines that engagement of the dog clutch D1 has normally completed. For example, when the synchronization stroke STs is smaller than the predetermined stroke, the clutch engagement determination unit 96 determines that the dog clutch D1 is not engaged. The predetermined stroke is, for example, a predetermined lower limit value of the synchronization stroke STs for determining that the sleeve 58 has moved to the position at which the dog clutch D1 is placed in the engaged state. The determination is carried out by the clutch engagement determination unit 96, for example, after a lapse of a predetermined time from the start of engagement of the dog clutch D1. The predetermined time is, for example, a predetermined stroke time from the start of engagement of the dog clutch D1 to when the synchronization stroke STs becomes larger than or equal to the predetermined stroke.

Incidentally, when the hydraulic pressure Pd1 higher than the predetermined hydraulic pressure A is not supplied to the oil chamber 82b of the hydraulic actuator 82, the sleeve 58 is not moved to the position at which the dog clutch D1 is engaged. The non-engaged state of the dog clutch D1 due to such insufficient hydraulic pressure Pd1 is apparently the same as the non-engaged state of the dog clutch D1 due to occurrence of an uplock. The insufficient hydraulic pressure Pd1 is, for example, because the source pressure of the hydraulic pressure Pd1 is not sufficiently generated from the oil pump 42, and is caused by factors that the oil pump 42 is not sufficiently rotationally driven by the engine 12. Rotational driving of the engine 12, for example, becomes insufficient at an engine startup process in which the engine rotational speed Ne increases from the state where the rotation of the engine 12 is stopped. Therefore, when the engine rotational speed Ne increases to, for example, an idle rotational speed, the insufficient hydraulic pressure Pd1 is resolved, and the dog clutch D1 is engaged. Then, if the hydraulic actuator 82 is operated to re-engage the dog clutch D1 as a result of a simple determination that the dog clutch D1 is not engaged without determining what is the cause of the non-engaged state of the dog clutch D1, it takes time to engage the dog clutch D1 more than necessary, and there is a concern that drivability (for example, acceleration responsiveness) deteriorates. In the present embodiment, when the hydraulic pressure Pd1 is insufficient, the hydraulic actuator 82 is not operated to re-engage the dog clutch D1, and the hydraulic actuator 82 is operated to re-engage the dog clutch D1 only when there is an uplock.

At the time when the hydraulic actuator 82 is operated to engage the dog clutch D1, when it is detected that the hydraulic pressure Pd1 for operating the hydraulic actuator 82 is higher than or equal to the predetermined hydraulic pressure A, the clutch engagement determination unit 96 determines that the dog clutch D1 is not engaged. When the synchronization stroke STs is smaller than the predetermined stroke at the time when it is detected that the hydraulic pressure Pd1 for operating the hydraulic actuator 82 is higher than or equal to the predetermined hydraulic pressure A, the clutch engagement determination unit 96 determines that there is an uplock of the dog clutch D1. Irrespective of whether the hydraulic pressure Pd1 is higher than or equal to the predetermined hydraulic pressure A, when the synchronization stroke STs is larger than or equal to the predetermined stroke, the clutch engagement determination unit 96 determines that engagement of the dog clutch D1 has normally completed.

Therefore, the electronic control unit 90 further includes a hydraulic pressure increase determination unit 98 that determines an increase of the hydraulic pressure. The hydraulic pressure increase determination unit 98, for example, determines whether the hydraulic pressure Pd1 is higher than or equal to the predetermined hydraulic pressure A. Whether the hydraulic pressure Pd1 is higher than or equal to the predetermined hydraulic pressure A may be, for example, directly determined on the basis of a detected value of a hydraulic pressure sensor that detects the hydraulic pressure Pd1 or may be determined indirectly on the basis of whether a hydraulic pressure associated with the hydraulic pressure Pd1 is higher than or equal to a predetermined hydraulic pressure B. The hydraulic pressure associated with the hydraulic pressure Pd1 is, for example, a hydraulic pressure that is generated from the oil pump 42 and that is the source pressure of the hydraulic pressure Pd1, the primary pressure Pin that is supplied to the hydraulic cylinder 60c of the primary pulley 60, the belt clamping pressure Pb, or the like. The predetermined hydraulic pressure B is, for example, a lower limit value of the hydraulic pressure associated with the hydraulic pressure Pd1, which is determined in advance as a hydraulic pressure at which the hydraulic pressure Pd1 is higher than or equal to the predetermined hydraulic pressure A. As described above, because the hydraulic pressure Pd1 becomes insufficient in process of a startup of the engine 12, the hydraulic pressure increase determination unit 98 determines whether the hydraulic pressure Pd1 is higher than or equal to the predetermined hydraulic pressure A, for example, at the time when the engine 12 starts operating from a state where the engine 12 is stopped. At an engine startup, for example, the vehicle is stopped. Therefore, when the continuously variable transmission 24 is set to the lowest gear ratio γ max, the belt clamping pressure Pb associated with generation of the tension of the transmission belt 66 is allowed to be increased; however, the primary pressure Pin does not need to be increased. Therefore, the hydraulic pressure associated with the hydraulic pressure Pd1 is desirably set to the belt clamping pressure Pb.

Figure 6:
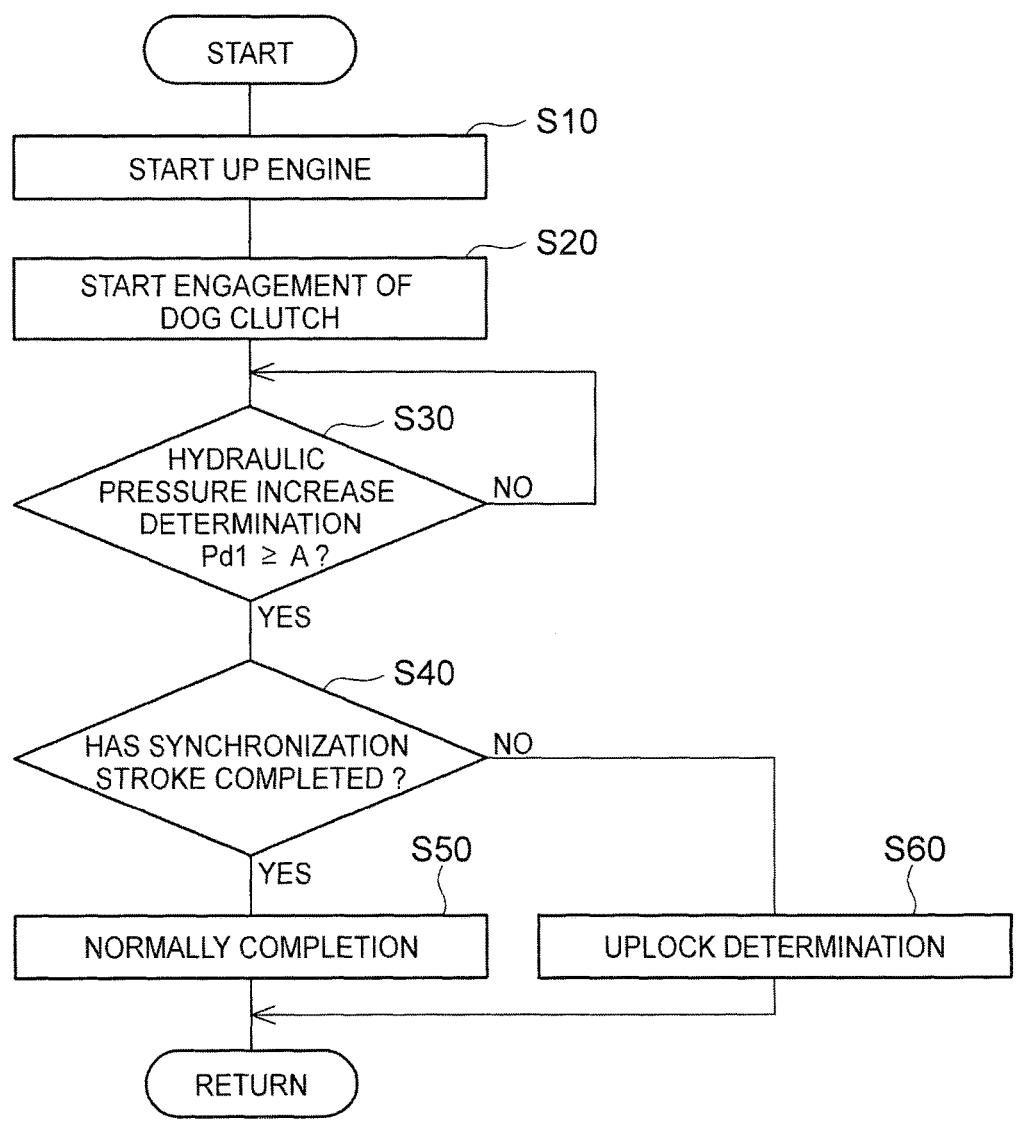
FIG. 6 is a flowchart that illustrates a relevant portion of control operations of an electronic control unit provided in a control apparatus for the power transmission system according to the embodiment, that is, control operations for preventing consumption of time to engage the dog clutch due to unnecessary re-engagement operation at the time when a hydraulic actuator is operated to engage the dog clutch.
Figure 7:
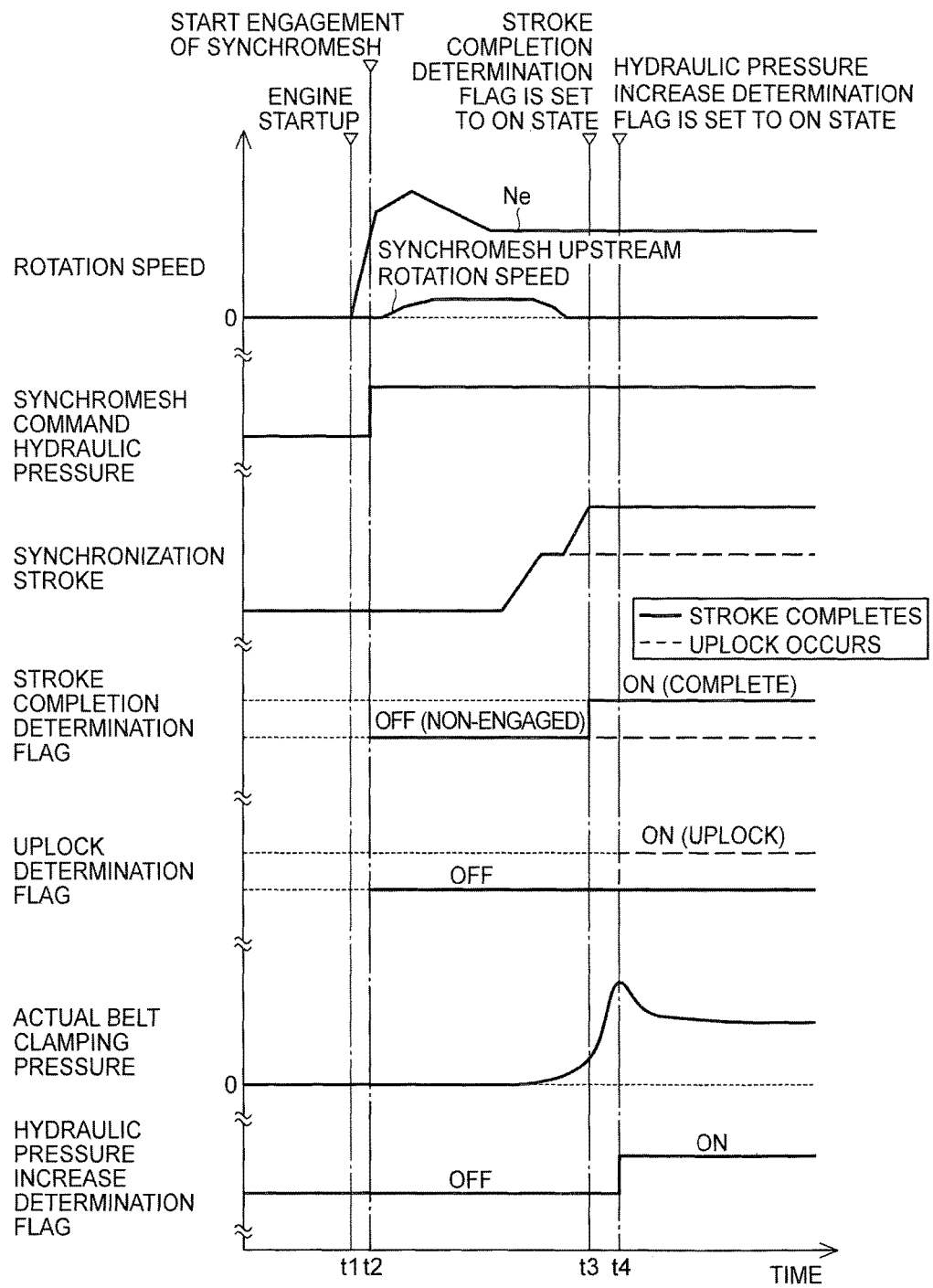
FIG. 7 is an example of a time chart in the case where the control operations shown in the flowchart of FIG. 6 are executed.

FIG. 6 is a flowchart that illustrates a relevant portion of control operations of the electronic control unit 90, that is, control operations for preventing consumption of time to engage the dog clutch D1 due to unnecessary re-engagement operation at the time when the hydraulic actuator 82 is operated to engage the dog clutch D1. The flowchart is, for example, repeatedly executed. FIG. 7 is an example of a time chart in the case where the control operation shown in the flowchart of FIG. 6 are executed.

As shown in FIG. 6, initially, step (hereinafter, step is omitted) S10 corresponding to the engine output control unit 92, for example, indicates that a startup of the engine 12 has started (see t1 timing in FIG. 7). Subsequently, in S20 corresponding to the shift control unit 94, for example, the hydraulic actuator 82 starts to be operated to engage the dog clutch D1 (see t2 timing in FIG. 7). Subsequently, in S30 corresponding to the hydraulic pressure increase determination unit 98, for example, it is determined whether the hydraulic pressure Pd1 is higher than or equal to the predetermined hydraulic pressure A. When negative determination is made in S30, S30 is repeatedly executed. When affirmative determination is made in S30, in S40 corresponding to the clutch engagement determination unit 96, for example, whether engagement of the dog clutch D1 has completed (in other words, whether it has been already determined that the synchronization stroke has completed) is determined on the basis of whether the synchronization stroke STs is larger than or equal to the predetermined stroke (see t4 timing in FIG. 7). When affirmative determination is made in S40, in S50 corresponding to the clutch engagement determination unit 96, for example, it is determined that engagement of the dog clutch D1 has normally completed (see the continuous line in FIG. 7). On the other hand, when negative determination is made in S40, in S60 corresponding to the clutch engagement determination unit 96, for example, it is determined that there is an uplock of the dog clutch D1 (see the broken line in FIG. 7).

In FIG. 7, t1 timing indicates that an engine startup has begun while the vehicle is stopped. t2 timing indicates that engagement of the dog clutch D1 has started. Completion of engagement (that is, completion of stroke) of the dog clutch D1 is determined after a lapse of a predetermined time from t2 timing. As indicated by the continuous line, it is determined at t3 timing that engagement of the dog clutch D1 has completed, and a stroke completion determination flag is set to an on state (completion). The embodiment of FIG. 7 shows the case at an engine startup, so it is detected whether the hydraulic pressure Pd1 for operating the hydraulic actuator 82 has increased to a value higher than or equal to the predetermined hydraulic pressure A, and, when it is detected that the hydraulic pressure Pd1 has increased to a value higher than or equal to the predetermined hydraulic pressure A and a hydraulic pressure increase determination flag is set to an on state as shown at t4 timing, an uplock of the dog clutch D1 is determined on the basis of the stroke completion determination flag. Therefore, as indicated by an uplock determination flag, before t4 timing, that is, when the hydraulic pressure increase determination flag is in an off state, an uplock is not determined even when the stroke completion determination flag is in the off state (not engaged). As indicated by the broken line, at t4 timing, the uplock determination flag is set to an on state when the stroke completion determination flag is in the off state. Thus, when completion of engagement of the dog clutch D1 delays because of a simple delay of increase of the hydraulic pressure (for example, the embodiment indicated by the continuous line), an uplock is not determined. In this embodiment, it is determined on the basis of an actual belt clamping pressure Pb whether the hydraulic pressure Pd1 is higher than or equal to the predetermined hydraulic pressure A.

As described above, according to the present embodiment, at the time when the hydraulic actuator 82 is operated to engage the dog clutch D1, after it is detected that the hydraulic pressure Pd1 for operating the hydraulic actuator 82 has increased to a value higher than or equal to the predetermined hydraulic pressure A, it is determined whether the dog clutch D1 is not engaged. Therefore, determination of non-engagement due to insufficient hydraulic pressure for operating the hydraulic actuator 82 is prevented. Thus, at the time when the hydraulic actuator 82 is operated to engage the dog clutch D1, it is possible to prevent delay to engage the dog clutch D1 due to unnecessary re-engagement operation.

According to the present embodiment, at the time when the engine 12 starts operating from a state where the engine 12 was stopped, it is determined whether the hydraulic pressure Pd1 for operating the hydraulic actuator 82 is higher than or equal to the predetermined hydraulic pressure A. Therefore, for the possibility that it is not possible to quickly complete engagement because of insufficient hydraulic pressure even when the hydraulic actuator 82 starts to be operated to engage the dog clutch D1 at the time when the engine 12 starts operating from a state where the engine 12 was stopped, determination of non-engagement due to insufficient hydraulic pressure for operating the hydraulic actuator 82 is prevented.

The embodiment of the invention is described in detail with reference to the accompanying drawings; however, the invention is also applied to other embodiments.

For example, in the above-described embodiment, whether engagement of the dog clutch D1 has completed is determined on the basis of the synchronization stroke STs; however, the invention is not limited to this configuration. For example, whether engagement of the dog clutch D1 has completed may be determined on the basis of whether the rotation of the clutch hub 54 that is the input-side rotating member of the dog clutch D1 and the rotation of the clutch gear 56 that is the output-side rotating member have synchronized with each other. That is, synchronization of rotation may be determined on the basis of the rotational speeds of the two rotating members (the clutch hub 54 and the clutch gear 56), the respective rotational speeds changing as the dog clutch D1 is engaged. Specifically, as shown in FIG. 7, when the engine rotational speed Ne is kept higher than or equal to a certain level in the case where the dog clutch D1 is released, a synchromesh upstream rotational speed corresponding to the rotational speed of the clutch hub 54 is increased to a rotational speed higher than zero because of a drag of the forward clutch C1. Because the rotational speed of the clutch gear 56 is substantially zero when the vehicle is stopped, when the dog clutch D1 is engaged, the rotational speed of the clutch hub 54 is set to substantially zero. Therefore, when the rotational speed of the clutch hub 54 is set to zero, it is determined that the synchromesh upstream rotational speed and a synchromesh downstream rotational speed corresponding to the rotational speed of the clutch gear 56 have synchronized with each other, and it is determined that engagement of the dog clutch D1 has completed. Other than the rotational speed of the clutch hub 54, the rotational speed of any one of the rotating members (for example, the small-diameter gear 44, the gear mechanism counter shaft 46, the large-diameter gear 48, and the like) between the output-side rotating member of the forward clutch C1 and the clutch hub 54 may be used as the synchromesh upstream rotational speed. Other than the rotational speed of the clutch gear 56, the rotational speed of any one of the rotating members (for example, the idler gear 50, the output shaft 30, the drive wheels 14, and the like) on the output side of the clutch gear 56 may be used as the synchromesh downstream rotational speed.

In the above-described embodiment, at an engine startup, completion of engagement of the dog clutch D1 is determined when it is detected that the hydraulic pressure Pd1 has increased to a value higher than or equal to the predetermined hydraulic pressure A; however, the invention is not limited to this configuration. For, example, other than at an engine startup, completion of engagement of the dog clutch D1 may be determined on the condition that it is detected that the hydraulic pressure Pd1 has increased to a value higher than or equal to the predetermined hydraulic pressure A.

In the above-described embodiment, the oil pump 42 is directly coupled to the pump impeller 20p (that is, the oil pump 42 is directly coupled to the engine 12); however, the invention is not limited to this configuration. For example, the oil pump 42 may be indirectly coupled to the engine 12 via a gear pair (or a sprocket and a chain), or the like. The oil pump 42 may be directly or indirectly coupled to the input shaft 22. In short, the oil pump 42 just needs to be coupled to any one of the rotating members of the power transmission system 16 such that the oil pump 42 is rotationally driven by the engine 12. When the oil pump 42 is coupled to the input shaft 22 (turbine runner 20t, it is conceivable that an increase of the hydraulic pressure from the oil pump 42 delays at an engine startup as compared to the case where the oil pump 42 is coupled to the pump impeller 20p.

In the above-described embodiment, the gear mechanism 28 is a gear mechanism in which a single gear stage is established; however, the invention is not limited to this configuration. For example, the gear mechanism 28 may be a gear mechanism in which a plurality of gear stages having different gear ratios γ are established. That is, the gear mechanism 28 may be a stepped transmission that is shifted into two or more stages. The gear mechanism 28 is a gear mechanism that establishes a gear ratio at the lower side than the lowest gear ratio γ max of the continuously variable transmission 24 in terms of the gear ratio γ; however, the invention is not limited to this configuration. For example, the gear mechanism 28 may be a gear mechanism that establishes a gear ratio at the higher side than the highest gear ratio γ min of the continuously variable transmission 24 and a gear ratio at the lower side.

In the above-described embodiment, the driving pattern of the power transmission system 16 is changed by using the predetermined shift map; however, the invention is not limited to this configuration. For example, the driving pattern of the power transmission system 16 may be changed by calculating a driver's driving request amount (for example, required torque) on the basis of the vehicle speed V and the accelerator operation amount θacc and then setting a gear ratio that satisfies the required torque.

In the above-described embodiment, the power transmission system 16 includes the first power transmission path through the gear mechanism 28 and the second power transmission path through the continuously variable transmission 24; however, the invention is not limited to this configuration. For example, as long as the power transmission system 16 includes the dog clutch D1 that connects or interrupts the power transmission path for transmitting the power of the engine 12 toward the drive wheels 14 and the hydraulic actuator 82 that is operated to engage or release the dog clutch D1, the invention is applicable.

In the above-described embodiment, the engine 12 is illustrated as the driving force source; however, the invention is not limited to this configuration. For example, another prime mover, such as an electric motor, may be employed solely or in combination with the engine 12 as the driving force source. The power of the engine 12 is transmitted to the continuously variable transmission 24 and the gear mechanism 28 via the torque converter 20; however, the invention is not limited. For example, instead of the torque converter 20, another fluid transmission device, such as a fluid coupling having no torque amplification function, may be used. Alternatively, the fluid transmission device is not necessarily provided. The dog clutch D1 includes the synchromesh mechanism S1; however, the synchromesh mechanism S1 does not need to be provided.

The above-described embodiment is only illustrative, and the invention may be implemented in modes including various modifications or improvements on the basis of the knowledge of persons skilled in the art.

What is claimed is:

1. A control apparatus for a power transmission system, the power transmission system including a dog clutch and a hydraulic actuator, the dog clutch being configured to connect or interrupt a power transmission path that transmits power of a driving force source to a drive wheel side, the hydraulic actuator being configured to operate to engage or release the dog clutch, the control apparatus comprising:
   an electronic control unit configured to:
   when the electronic control unit operates the hydraulic actuator to engage the dog clutch,
   (i) determine whether the dog clutch is not engaged when the electronic control unit detects that a hydraulic pressure for operating the hydraulic actuator is higher than or equal to a predetermined hydraulic pressure, and
   (ii) operate the hydraulic actuator to engage the dog clutch again when the electronic control unit determines that the dog clutch is not engaged, wherein:
      the power transmission system further includes a mechanical oil pump, the mechanical oil pump is configured to generate a source pressure for the predetermined hydraulic pressure that operates the hydraulic actuator by being rotationally driven by the driving force source, and
      the electronic control unit is configured to determine whether the hydraulic pressure for operating the hydraulic actuator is higher than or equal to the predetermined hydraulic pressure at a time when the driving force source starts operating in a state where the driving force source is stopping.

2. The control apparatus according to claim 1, wherein the electronic control unit is configured to determine whether the dog clutch is not engaged based on a moving distance of a movable member that engages the dog clutch.

3. The control apparatus according to claim 1, wherein the predetermined hydraulic pressure is a predetermined lower limit of the hydraulic pressure for engaging the dog clutch.

4. A control apparatus for a power transmission system, the power transmission system including a dog clutch and a hydraulic actuator, the dog clutch being configured to connect or interrupt a power transmission path that transmits power of a driving force source to a drive wheel side, the hydraulic actuator being configured to operate to engage or release the dog clutch, the control apparatus comprising:

an electronic control unit configured to:

when the electronic control unit operates the hydraulic actuator to engage the dog clutch, determine whether the dog clutch is not engaged based on rotational speeds of two rotating members, which change as the dog clutch is engaged, wherein:

the power transmission system further includes a mechanical oil pump, the mechanical oil pump is configured to generate a source pressure for the predetermined hydraulic pressure that operates the hydraulic actuator by being rotationally driven by the driving force source, and the electronic control unit is configured to determine whether the hydraulic pressure for operating the hydraulic actuator is higher than or equal to the predetermined hydraulic pressure at a time when the driving force source starts operating in a state where the driving force source is stopping.

\* \* \* \* \*